United States Patent
Kim et al.

(10) Patent No.: US 8,525,964 B2
(45) Date of Patent: Sep. 3, 2013

(54) ARRAY SUBSTRATE, METHOD OF MANUFACTURING THE SAME, DISPLAY PANEL HAVING THE SAME, AND LIQUID CRYSTAL DISPLAY APPARATUS HAVING THE SAME

(75) Inventors: In-Woo Kim, Yongin-si (KR); Sun-Ok Song, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/074,126

(22) Filed: Mar. 29, 2011

(65) Prior Publication Data

US 2011/0176078 A1    Jul. 21, 2011

Related U.S. Application Data

(63) Continuation of application No. 11/353,272, filed on Feb. 14, 2006, now Pat. No. 7,936,407.

(30) Foreign Application Priority Data

Feb. 24, 2005 (KR) .................................. 2005-15501
Jul. 8, 2005 (KR) .................................. 2005-61468

(51) Int. Cl.
  *G02F 1/1343* (2006.01)
(52) U.S. Cl.
  USPC .......................................... 349/144; 349/39
(58) Field of Classification Search
  USPC ............................................................ 349/144
  See application file for complete search history.

(56) References Cited

U.S. PATENT DOCUMENTS

| | | | |
|---|---|---|---|
| 5,646,702 A | 7/1997 | Akinwande et al. | |
| 5,748,276 A | 5/1998 | Uno et al. | |
| 5,777,700 A | 7/1998 | Kaneko et al. | |
| 7,379,143 B2 * | 5/2008 | Lyu ............................... | 349/130 |
| 7,474,363 B2 | 1/2009 | Kim et al. | |
| 7,483,090 B2 | 1/2009 | Shin et al. | |
| 7,554,617 B2 | 6/2009 | Jung et al. | |
| 7,683,987 B2 | 3/2010 | Yang et al. | |
| 2006/0092367 A1 | 5/2006 | Shin et al. | |
| 2006/0158575 A1 | 7/2006 | Shin et al. | |

FOREIGN PATENT DOCUMENTS

| | | |
|---|---|---|
| JP | 04-348323 A | 12/1992 |
| JP | 07-311390 A | 11/1995 |
| JP | 07-325322 A | 12/1995 |
| JP | 1997-043609 A | 2/1997 |
| JP | 1997-269509 A | 10/1997 |
| JP | 2000-122080 A | 4/2000 |
| JP | 2000-147462 A | 5/2000 |
| JP | 2006-184516 A | 7/2006 |
| KR | 0261934 B1 | 4/2000 |
| KR | 1020050018099 A | 2/2005 |
| KR | 1020060074886 A | 7/2006 |

\* cited by examiner

*Primary Examiner* — Uyen Chau N Le
*Assistant Examiner* — John M Bedtelyon
(74) *Attorney, Agent, or Firm* — Cantor Colburn LLP

(57) ABSTRACT

An array substrate includes a switching device, a storage capacitor and a voltage-dividing capacitor. The switching device is formed in a pixel region defined by two gate lines adjacent to each other and two data lines adjacent to each other. The storage capacitor is electrically connected to the switching device. The voltage-dividing capacitor is disposed between the storage capacitor and one of the gate lines. The voltage-dividing capacitor is electrically connected to the storage capacitor. Therefore, an overlapping area with the data lines is reduced to reduce the RC delay and enhance aperture ratio. Furthermore, a possibility of occurrence of an electrical short is reduced.

10 Claims, 13 Drawing Sheets

ARRAY SUBSTRATE, METHOD OF MANUFACTURING THE SAME, DISPLAY PANEL HAVING THE SAME, AND LIQUID CRYSTAL DISPLAY APPARATUS HAVING THE SAME

CROSS REFERENCE TO RELATED APPLICATIONS

This application is a continuation of U.S. application Ser. No. 11/353,272, filed on Feb. 14, 2006, which claims priority to Korean Patent Application No. 2005-15501 filed on Feb. 24, 2005, and Korean Patent Application No. 2005-61468 filed on Jul. 8, 2005, and all the benefits accruing therefrom under 35 U.S.C. §119, and the contents of which in their entireties are herein incorporated by reference.

BACKGROUND OF THE INVENTION

1. Field of the Invention

The present invention relates to an array substrate, a method of manufacturing the array substrate, a display panel having the array substrate, and a liquid crystal display apparatus having the array substrate. More particularly, the present invention relates to an array substrate capable of enhancing a viewing angle and an aperture ratio, a method of manufacturing the array substrate, a display panel having the array substrate, and a liquid crystal display apparatus having the array substrate.

2. Description of the Related Art

Generally, a liquid crystal display ("LCD") device has a narrower viewing angle than that of a cathode ray tube ("CRT") display device. In order to widen the viewing angle, a patterned vertical alignment ("PVA") mode LCD device, a multi-domain first sub vertical alignment ("MVA") mode LCD device, an in-plane switching ("IPS") mode LCD device, etc. have been developed recently.

The PVA mode LCD device includes an upper substrate, a lower substrate, and a liquid crystal layer positioned there between and having liquid crystal molecules arranged vertically with respect to the upper and lower substrates. According to the PVA mode LCD device, the pixel electrodes on the lower substrate and the common electrode on the upper substrate include an opening pattern. Viewing angle is widened due to fringe fields generated by the pixel electrodes and the common electrode.

BRIEF SUMMARY OF THE INVENTION

The present invention provides an array substrate capable of enhancing a viewing angle and an aperture ratio.

The present invention also provides a method of manufacturing the above-mentioned array substrate.

The present invention also provides a display panel having the above-mentioned array substrate.

The present invention also provides an LCD apparatus having the above-mentioned array substrate.

In exemplary embodiments of an array substrate according to the present invention, the array substrate includes a switching device, a storage capacitor, and a voltage-dividing capacitor. The switching device is formed in a pixel region defined by two gate lines adjacent to each other and two data lines adjacent to each other. The storage capacitor is electrically connected to the switching device. The voltage-dividing capacitor is disposed between the storage capacitor and one of the gate lines. The voltage-dividing capacitor is electrically connected to the storage capacitor.

For example, a capacitance of the storage capacitor is bigger than a capacitance of the voltage-dividing capacitor.

The storage capacitor is defined by the storage common wiring and a storage electrode extended from a drain electrode of the switching device, where the storage electrode is disposed over the storage common wiring.

The voltage-dividing capacitor includes a floating electrode that is separated from the storage common wiring.

In particular, the voltage-dividing capacitor further includes a voltage-dividing capacitor electrode extended from the storage electrode, and the voltage-dividing capacitor electrode at least partly overlaps with the floating electrode.

The array substrate may further include a first sub pixel electrode electrically connected to the storage electrode through a first contact hole, and a second sub pixel electrode electrically connected to the floating electrode through a second contact hole.

The first sub pixel electrode may receive a first voltage from the storage capacitor, and the second sub pixel electrode may receive a second voltage from the voltage-dividing capacitor that is less than the first voltage.

The first sub pixel electrode may occupy a greater area within the pixel region than the second sub pixel electrode.

In other exemplary embodiments of an array substrate according to the present invention, the array substrate includes a switching device, a storage capacitor, a first voltage-dividing capacitor, and a second voltage-dividing capacitor. The switching device is formed in a pixel region. The storage capacitor includes a storage common wiring dividing the pixel region into a first region and a second region, and a storage electrode extended from a drain electrode of the switching device to be disposed over the storage common wiring. The first voltage-dividing capacitor includes a first floating electrode formed in the first region, and a first voltage-dividing capacitor electrode extended from the storage electrode to be disposed over the first floating electrode. The second voltage-dividing capacitor includes a second floating electrode formed in the second region, and a second voltage-dividing capacitor electrode extended from the storage electrode to be disposed over the second floating electrode.

The array substrate may further include a first sub pixel electrode, a second sub pixel electrode, and a third sub pixel electrode. The first sub pixel electrode is electrically connected to the storage electrode of the storage capacitor. The second sub pixel electrode is electrically connected to the first floating electrode of the first voltage-dividing capacitor and disposed in the first region. The third sub pixel electrode is electrically connected to the second floating electrode of the second voltage-dividing capacitor and is disposed in the second region.

The first sub pixel electrode may be disposed in both the first region and the second region, and may occupy a greater area of the pixel region than the second and third sub pixel electrodes.

The first sub pixel electrode may receive a first voltage from the storage capacitor, the second sub pixel electrode may receive a second voltage from the first voltage-dividing capacitor that is less than the first voltage, and the third sub pixel electrode may receive a third voltage from the second voltage-dividing capacitor that is less than the first voltage. The second and third voltages may be substantially same. Alternatively, the third voltage may be less than the second voltage.

The first, second, and third sub pixel electrodes may have opening patterns.

The first and second voltage-dividing capacitors may have a substantially same size. Alternatively, the first and second voltage-dividing capacitors may have different sizes from each other.

A capacitance of the storage capacitor may be larger than a capacitance of the first voltage-dividing capacitor, and a capacitance of the first voltage-dividing capacitor may be larger than or the same as a capacitance of the second voltage-dividing capacitor.

In exemplary embodiments of a display panel according to the present invention, the display panel includes a first substrate, a second substrate, and a liquid crystal layer. The first substrate includes a common electrode. The second substrate faces the first substrate. The second substrate includes a storage capacitor and a first voltage-dividing capacitor. The storage capacitor includes a storage common wiring and a storage electrode disposed over the storage common wiring. The first voltage-dividing capacitor includes a first floating electrode and a first voltage-dividing capacitor electrode that is disposed over the first floating electrode and electrically connected to the storage electrode. The liquid crystal layer is disposed between the first and second substrates.

The first floating electrode of the first voltage-dividing capacitor is spaced apart from the storage common wiring.

The second substrate may further include a first sub pixel electrode, and a second sub pixel electrode. The first sub pixel electrode is electrically connected to the storage electrode of the storage capacitor. The second sub pixel electrode is electrically connected to the first floating electrode of the first voltage-dividing capacitor. The first sub pixel electrode and the second sub pixel electrode have a first opening pattern.

The common electrode includes a second opening pattern that is discrepantly formed with respect to the first opening pattern.

The storage capacitor and the voltage-dividing capacitor have, for example, a different size from each other. As a result, the liquid crystal layer includes a first portion of liquid crystal molecules disposed between the first sub pixel electrode and the common electrode, and a second portion of liquid crystal molecules disposed between the second sub pixel electrode and the common electrode, the first portion of liquid crystal molecules and the second portion of liquid crystal molecules forming a different inclination angle when the display panel is driven.

An inclination angle between the first portion of liquid crystal molecules and a virtual plane may be less than an inclination angle between the second portion of liquid crystal molecules and the virtual plane. An inclination angle of the first portion of liquid crystal molecules and the second portion of liquid crystal molecules is substantially 90 degrees when the display panel is not driven, and the inclination angle between the second portion of liquid crystal molecules and the virtual plane may be less than 90 degrees when the display panel is driven.

The second substrate includes a second voltage-dividing capacitor including a second floating electrode and a second voltage-dividing capacitor electrode that is disposed over the second floating electrode and electrically connected to the storage electrode, and the first and second voltage-dividing capacitor electrodes are disposed at opposite sides with reference to the storage common wiring.

For example, the first and second voltage-dividing capacitors may have a different size from each other.

In exemplary embodiments of an LCD apparatus according to the present invention, the LCD apparatus includes a first sub liquid crystal capacitor, a second sub liquid crystal capacitor, a storage capacitor, and a first voltage-dividing capacitor. The first sub liquid crystal capacitor receives a pixel voltage from a switching device. The second sub liquid crystal capacitor is adjacent to the first sub liquid crystal capacitor. The storage capacitor first sustains the pixel voltage applied to the first sub liquid crystal capacitor. The first voltage-dividing capacitor applies a voltage that is smaller than the pixel voltage to the second sub liquid crystal capacitor.

The second sub liquid crystal capacitor and the storage capacitor are electrically connected to each other in parallel, and the second sub liquid crystal capacitor and the first voltage-dividing capacitor are electrically connected to each other in series to divide the pixel voltage.

The first sub liquid crystal capacitor includes a common electrode, a first sub pixel electrode, and a liquid crystal layer. The common electrode is formed on a first substrate. The first sub pixel electrode is formed on a second substrate. The liquid crystal layer is disposed between the common electrode and the first sub pixel electrode. The storage capacitor includes a storage electrode and a storage common wiring. The storage electrode is electrically connected to the first sub pixel electrode and the switching device to receive the pixel voltage. The storage common wiring is spaced apart from the storage electrode and faces the storage electrode.

The second sub liquid crystal capacitor includes the common electrode, a second sub pixel electrode, and a liquid crystal layer. The common electrode is formed on the first substrate. The second sub pixel electrode is formed on the second substrate. The liquid crystal layer is disposed between the common electrode and the first pixel electrode. The first voltage-dividing capacitor includes a first voltage-dividing capacitor and a first floating electrode. The first voltage-dividing capacitor electrode is electrically connected to the storage electrode of the storage capacitor to receive the pixel voltage. The first floating electrode faces the first voltage-dividing capacitor electrode and is electrically connected to the second sub pixel electrode.

The LCD apparatus may further include a third sub liquid crystal capacitor and a second voltage-dividing capacitor. The third sub liquid crystal capacitor is adjacent to the storage capacitor. The second voltage-dividing capacitor is electrically connected to the third sub liquid crystal capacitor in series to apply a voltage that is lower than the pixel voltage to the third sub liquid crystal capacitor.

The second and third sub liquid crystal capacitors are disposed at opposite sides with respect to the first sub liquid crystal capacitor.

A capacitance of the second sub liquid crystal capacitor is, for example, substantially equal to a capacitance of the third sub liquid crystal capacitor. Alternatively, a capacitance of the second sub liquid crystal capacitor may be different from a capacitance of the third sub liquid crystal capacitor.

The LCD apparatus may further include a liquid crystal layer. Liquid crystal molecules within a first portion of a pixel region formed within the first sub liquid crystal capacitor have a different inclination angle with respect to a virtual plane than liquid crystal molecules within a second portion of the pixel region formed within the second sub liquid crystal capacitor.

In exemplary embodiments of a method of manufacturing an array substrate according to the present invention, a first metal layer is formed on a base substrate. The first metal layer is patterned to form a gate electrode, a storage common wiring and a first floating electrode that is spaced apart from the storage common wiring. A gate insulation layer is formed on the base substrate having the gate electrode, the storage common wiring and the first floating electrode formed thereon. A portion of the gate insulation layer is removed to expose a portion of the first floating electrode. A second metal layer is formed on the gate insulation layer. The second metal layer is patterned to form a drain electrode, a source electrode spaced apart from the drain electrode, a storage electrode that is electrically connected to the drain electrode and disposed over the storage common wiring, and a first voltage-dividing capacitor electrode that is electrically connected to the storage electrode and disposed over the first floating electrode. A portion of the first voltage-dividing capacitor electrode is removed to expose the first floating electrode. An optically transparent and electrically conductive layer that is electrically connected to the first floating electrode and the storage electrode is formed. Then, the optically transparent and electrically conductive layer is patterned to form a first sub pixel electrode that is electrically connected to the storage electrode, and a second sub pixel electrode that is electrically connected to the first floating electrode and electrically insulated from the first sub pixel electrode.

Therefore, an overlapping area with the data lines is reduced to reduce the RC delay and enhance aperture ratio. Furthermore, a possibility of an occurrence of an electrical short is reduced. Additionally, when the storage capacitor has different sizes, a viewing angle may be widened even more.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
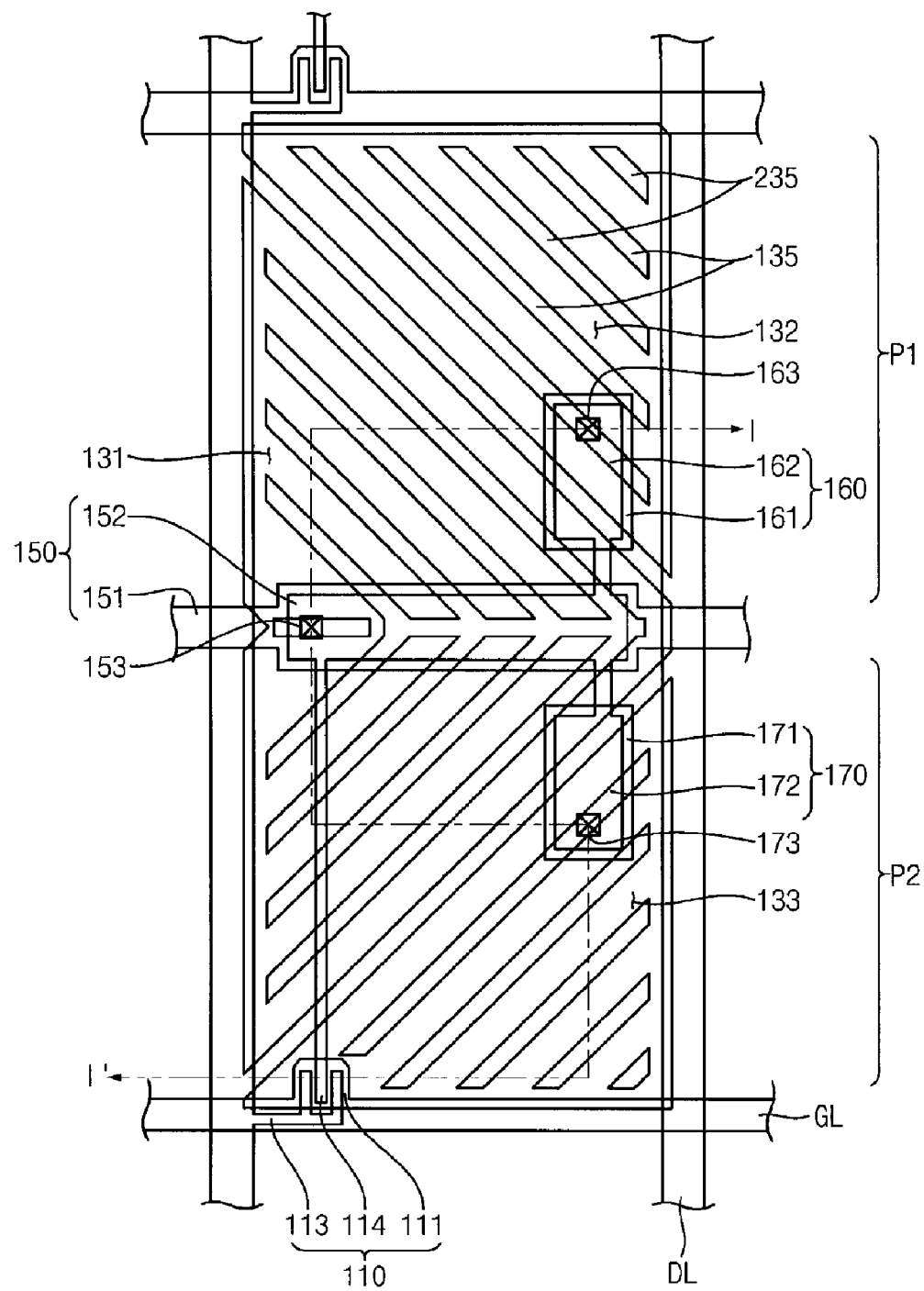
FIG. 1 is a layout illustrating an exemplary embodiment of a pixel portion of a display panel according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
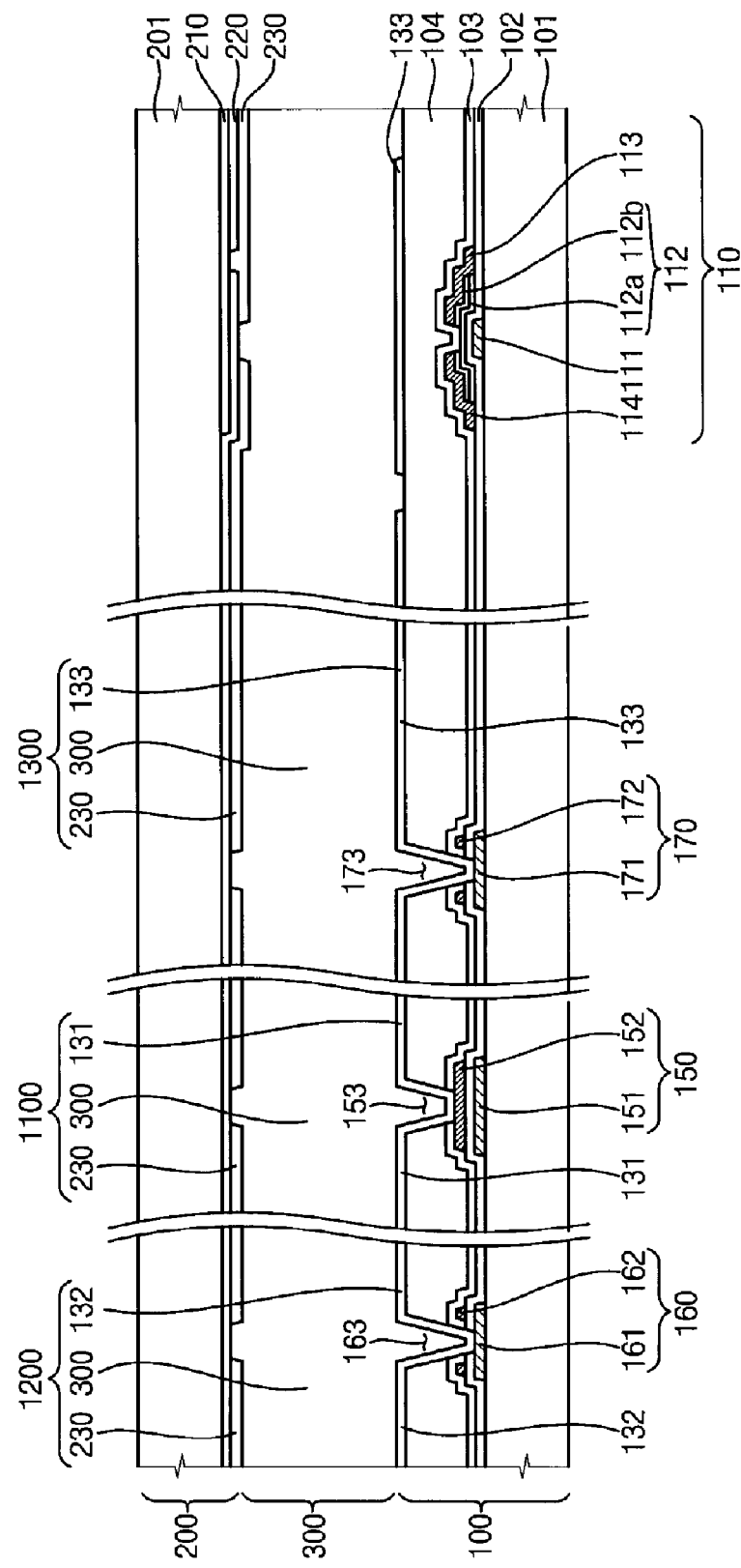
FIG. 2 is a cross-sectional view taken along line I-I' in FIG. 1.

FIG. 1 is a layout illustrating an exemplary embodiment of a pixel portion of a display panel according to the present invention, and FIG. 2 is a cross-sectional view taken along line I-I' in FIG. 1.

Referring to FIGS. 1 and 2, a display panel includes an array substrate 100, a color filter substrate 200, and a liquid crystal layer 300 disposed between the array substrate 100 and the color filter substrate 200.

The array substrate 100 includes a first transparent substrate 101, a plurality of gate lines GL, a plurality of data lines (or source lines) DL, and a plurality of pixel portions. The gate lines GL and the data lines DL are disposed over (or formed on) the first transparent substrate 101, which may be an insulating substrate. The gate lines GL are extended along a first direction, and the data lines DL are extended along a second direction that is substantially perpendicular to the first direction. The gates lines GL and the data lines DL are insulated from each other by, for example, the gate insulation layer 102, as will be further described below. Each pixel portion is defined by one of the gate lines GL and one of the data lines DL. In other words, a pixel portion is positioned between an adjacent pair of gate lines GL and an adjacent pair of data lines DL, although the pixel electrode contained therein is connected to one gate line GL and one data line DL of each pair.

Each of the pixel portions includes a first sub liquid crystal capacitor 1100, a second sub liquid crystal capacitor 1200, a storage capacitor 150, and a first voltage-dividing capacitor 160. The storage capacitor 150 is a first sub capacitor, and the first-voltage dividing capacitor 160 is a second sub capacitor of the pixel portion. The first sub liquid crystal capacitor 1100 receives a pixel voltage from a switching device 110, as will be further described below. The second sub liquid crystal capacitor 1200 is adjacent to the first sub liquid crystal capacitor 1100. The storage capacitor 150 is electrically connected to the second sub liquid crystal capacitor 1200 in parallel, so that the storage capacitor 150 first sustains the pixel voltage applied to the first sub liquid crystal capacitor 1100. The first voltage-dividing capacitor 160 is electrically connected to the second sub liquid crystal capacitor 1200, so that the pixel voltage is divided by the first voltage-dividing capacitor 160 and the second sub liquid crystal capacitor 1200. As a result, a voltage that is lower than the pixel voltage is applied to the second sub liquid crystal capacitor 1200. Each pixel portion may further include a third sub liquid crystal capacitor 1300 and a second voltage-dividing capacitor 170 electrically connected to the third sub liquid crystal capacitor 1300 in parallel. The second voltage-dividing capacitor 170 is a third sub capacitor of the pixel portion.

In addition to the storage capacitor 150, the first voltage-dividing capacitor 160, the second voltage-dividing capacitor 170, and the switching device 110, each pixel portion also includes a first sub pixel electrode 131, a second sub pixel electrode 132, and a third sub pixel electrode 133.

The switching device 110 includes a gate electrode 111 electrically connected to one of the gate lines GL, a source electrode 113 electrically connected to one of the data lines DL, and a drain electrode 114 electrically connected to the first sub pixel electrode 131. A semiconductor layer 112 is disposed between the gate electrode 111, and the source and drain electrodes 113, 114. The semiconductor layer 112 includes an activation layer 112a and an ohmic contact layer 112b. The switching device 110 may be embodied as an inverse staggered type, otherwise known as a bottom gate thin film transistor ("TFT"), as shown in FIG. 2. Alternatively, the switching device 110 may be embodied as a staggered type, otherwise known as a top gate TFT.

The first sub pixel electrode 131 is electrically connected to the drain electrode 114 through a first contact hole 153. As illustrated in FIG. 1, the first sub pixel electrode 131 may have a substantially triangular shape having a first side corresponding to a data line DL defining the pixel portion, such as the data line DL from which the source electrode 113 extends, and second and third sides extending from opposite ends of the first side to a point overlying the storage common wiring 151 of the storage capacitor 150. For example, the point overlying the storage common wiring 151 may extend to the data line DL that is adjacent to the data line DL defining the pixel portion and bordering the pixel portion. The first sub pixel electrode 131 may have indentations along areas overlying the storage common wiring 151. The second sub pixel electrode 132 and the third sub pixel electrode 133 are symmetrical with respect to the first sub pixel electrode 131, and while spaced from the first sub pixel electrode 131, may substantially fill a remaining area of the pixel area not occupied by the first sub pixel electrode 131. For example, the second sub pixel electrode 132 and the third sub pixel electrode 133 may be substantially right-triangular shaped with first sides parallel to the second and third sides, respectively, of the first sub pixel electrode 131, second sides corresponding to the data line DL, and third sides corresponding to opposite gate lines GL. Thus, the second and third sub pixel electrodes 132, 133 have smaller areas than the first sub pixel electrode 131. While a particular arrangement of the first, second, and third sub pixel electrodes 131, 132, and 133 has been illustrated and described, it should be understood that variations thereof are within the scope of these embodiments.

The first sub pixel electrode 131, the second sub pixel electrode 132, and the third sub pixel electrode 133 include first opening patterns 135. By example only, the opening patterns 135 on one side of the storage common wiring 151 may extend at 45 degree angles relative to the gate lines GL and may be spaced parallel with respect to each other. The opening patterns 135 on the opposite side of the storage common wiring 151 may extend at 135 degree angles relative to the gate lines GL and may be spaced parallel with respect to each other. The opening patterns 135 overlying the storage common wiring 151 may be arranged parallel to the storage common wiring 151. Thus, the opening patterns 135 on one side of the storage common wiring 151 may be a mirror image of opening patterns 135 on an opposite side of the storage common wiring 151 within each pixel portion. The first and third sub pixel electrodes 132 and 133 are separated from each other. The first and third sub pixel electrodes 132 and 133 are electrically insulated from each other.

The storage capacitor 150 includes the storage common wiring 151 and a storage electrode 152. The storage common wiring 151 is substantially in parallel with the gate lines GL, and divides the pixel portion into a first region P1 and a second region P2. The second sub pixel electrode 132 may thus be positioned in the first region P1, the third sub pixel electrode 133 may be positioned in the second region P2, and the first sub pixel electrode 131 may be positioned in both the first region P1 and the second region P2. The storage capacitor 150 is parallel connected to the first sub liquid crystal capacitor 1100 having the first sub pixel electrode 131, the liquid crystal layer 300, and the common electrode 230, so that the storage capacitor 150 first sustains the pixel voltage applied to the first sub pixel electrode 131.

The storage common wiring 151 having a first size corresponds to a first electrode of the storage capacitor 150. A storage electrode 152 extended from the drain electrode 114 corresponds to a second electrode of the storage capacitor 150. The first contact hole 153 is formed at an insulation layer 104 disposed on the storage electrode 152, so that the drain electrode 114 and the first sub pixel electrode 131 are electrically connected to each other through the first contact hole 153. A gate insulation layer 102 disposed between the storage electrode 152 and the storage common wiring 151 electrically insulates the storage electrode 152 and the storage common wiring 151 from each other.

The pixel voltage is applied to the drain electrode 114 through the switching device 110. The storage electrode 152 is electrically connected to the drain electrode 114 of the switching device 110, and thus the pixel voltage applied to the drain electrode 114 of the switching device 110 is applied to the first sub pixel electrode 131 through the source electrode 113.

Equal voltage (or the pixel voltage) is applied to both the storage electrode 152 and the first sub pixel electrode 131. As a result, a connection between the storage capacitor 150 including the storage electrode 152, and the first sub liquid crystal capacitor 1100 having the first sub pixel electrode 131 corresponds to a parallel connection.

The first voltage-dividing capacitor 160, positioned in the first region P1 of the pixel portion, includes a first floating electrode 161 and a first voltage-dividing capacitor electrode 162.

The first floating electrode 161 has a second size that is smaller than the first size of the storage common wiring 151. The first voltage-dividing capacitor electrode 162 that is extended from the storage electrode 152 is disposed over the first floating electrode 161. The first floating electrode 161 is electrically connected to the second sub pixel electrode 132 through the second contact hole 163. The first voltage-dividing capacitor electrode 162 is electrically connected to the storage electrode 152, so that the pixel voltage outputted from the drain electrode 114 of the switching device 110 is applied to the first voltage-dividing capacitor 162 through the storage electrode 152.

Furthermore, the second sub pixel electrode 132 that is opposite to the first voltage-dividing capacitor 160 is electrically connected to the first floating electrode 161. Therefore, a connection between the second sub liquid crystal capacitor 1200 having the second sub pixel electrode 132, and the first voltage-dividing capacitor 160 having the first floating electrode 161 corresponds to a serial connection.

Therefore, the pixel voltage applied to the first voltage-dividing capacitor electrode 162 is divided by the first voltage-dividing capacitor 160 and the second sub liquid crystal capacitor 1200. In other words, a voltage that is lower than the pixel voltage is applied to the second sub liquid crystal capacitor 1200.

The second voltage-dividing capacitor 170, which is a third sub capacitor of the pixel portion, includes a second floating electrode 171 and a second voltage-dividing capacitor electrode 172, and is positioned within the second region P2 of the pixel portion.

The second floating electrode 171 has the second size, or at least substantially the same size as the first floating electrode 161. Additionally, the first and second floating electrodes 161 and 171 are symmetrical with each other with respect to the storage common wiring 151.

The second voltage-dividing capacitor electrode 172 is extended from the storage electrode 152, and disposed over the second floating electrode 171. The second floating electrode 171 is electrically connected to the third sub pixel electrode 133 through the third contact hole 173. The second floating electrode 171 corresponds to a first electrode of the second voltage-dividing capacitor 170. The common electrode 230 of the color filter substrate 200 corresponds to a second electrode of the second voltage-dividing capacitor 170.

The color filter substrate 200 includes a second transparent substrate 201, a light-blocking layer 210, a color filter layer 220, and a common electrode 230.

The light-blocking layer 210 has a plurality of opening portions arranged in a matrix shape corresponding to the pixel portions of the array substrate 100. The light-blocking layer 210 blocks light that is leaked through a space between the pixel portions.

The color filter layers 220 are disposed on portions of the second transparent substrate 201 exposed through the opening portions of the light-blocking layer 210. The color filter layers 220 include, for example, a red color filter, a green color filter, and a blue color filter.

The common electrode 230 is formed on the color filter layers 220. The common electrode 230 corresponds to a counter electrode of the pixel electrode, which includes the first sub pixel electrode 131, the second sub pixel electrode 132, and the third sub pixel electrode 133. The common electrode 230 includes second opening patterns 235. The second opening patterns 235 are discrepantly disposed with the first opening patterns 135. In particular, when the array substrate 100 and the color filter substrate 200 are combined with each other, the first opening patterns 135 do not face the second opening patterns 235. In other words, each of the second opening patterns 235 is disposed between two adjacent first opening patterns 135.

The color filter substrate 200 optionally includes a leveling layer (not shown) disposed on the light blocking layer 210 and the color filter layers 220 in order to protect the light blocking layer 210 and the color filter layers 220 and level a surface defined by the light blocking layer 210 and the color filter layers 220.

The liquid crystal layer 300 is disposed between the array substrate 100 and the color filter substrate 200. When a pixel voltage is applied to the first sub, second sub, and third sub pixel electrodes 131, 132, and 133, and the common electrode 230, an arrangement of liquid crystal molecules within the liquid crystal layer 300 is altered.

FIGS. 3 through 10 are cross-sectional views illustrating an exemplary process of manufacturing the array substrate in FIG. 1.

Figure 3:
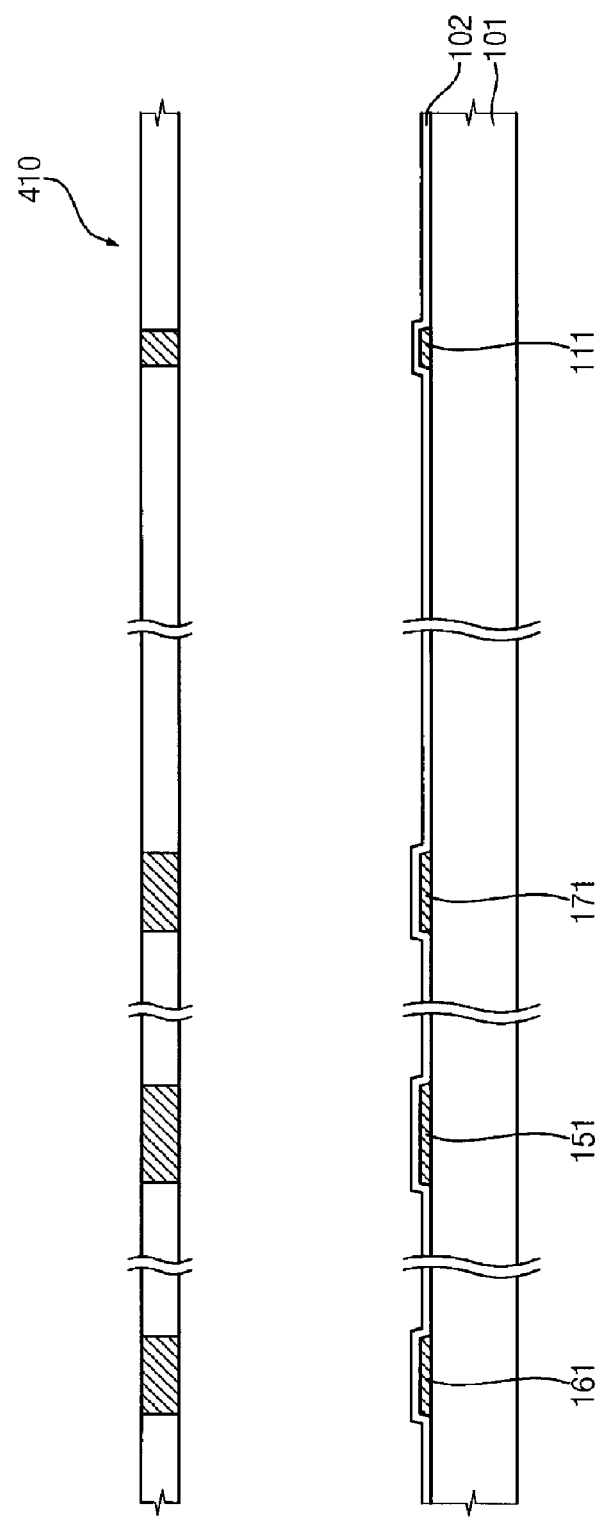
FIGS. 3 through 10 are cross-sectional views illustrating an exemplary process of manufacturing the array substrate in FIG. 1.
Figure 4:
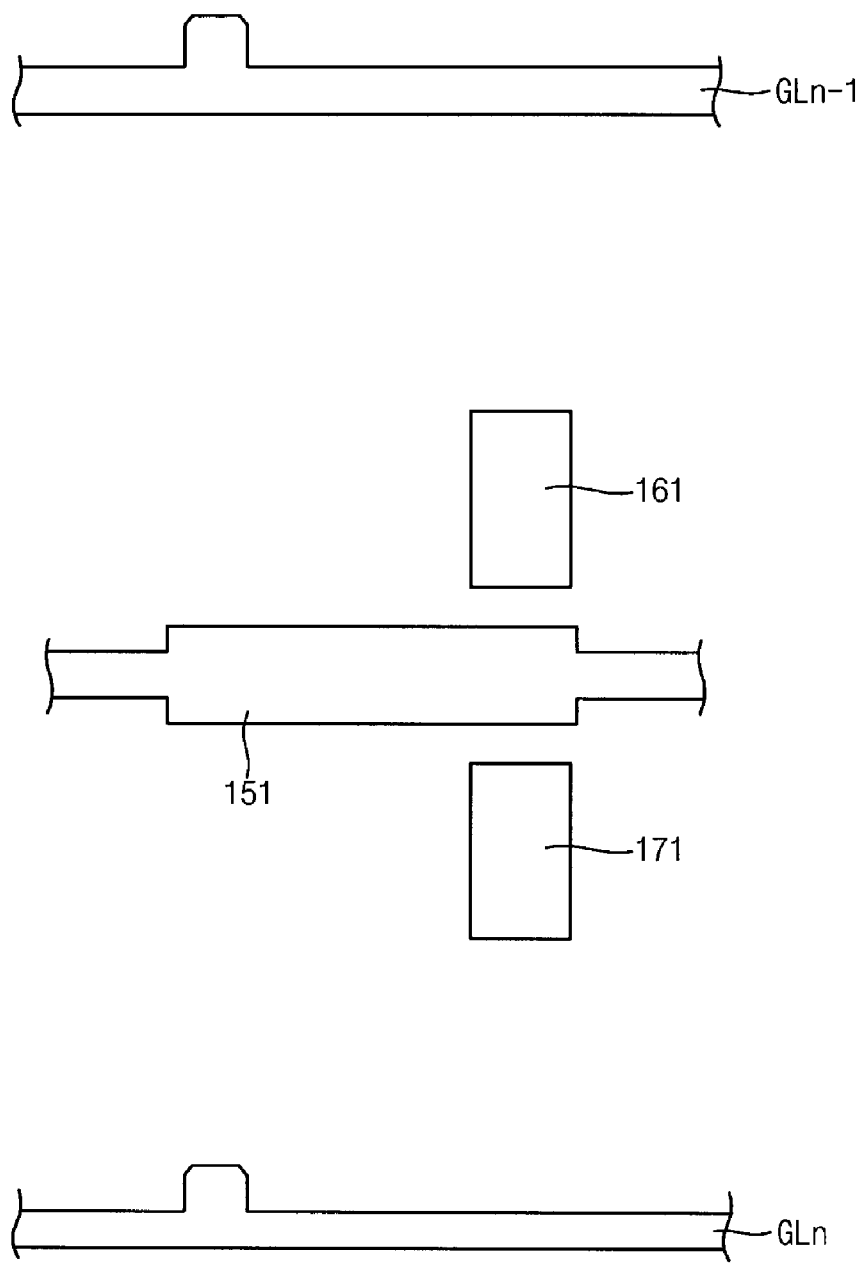
Figure 5:
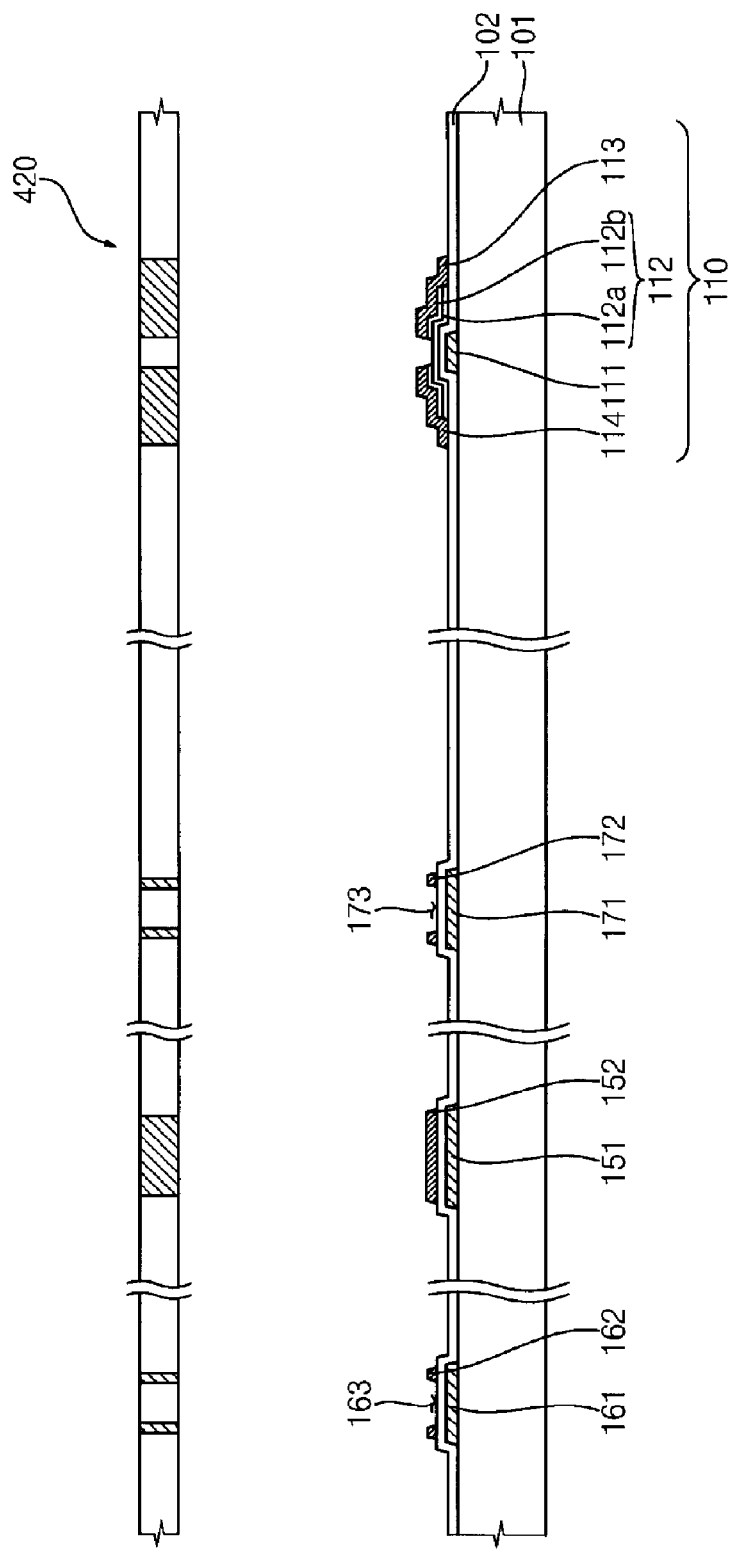

Referring to FIGS. 3 and 4, a gate metal layer is formed on the first transparent substrate 101. The gate metal layer is patterned by using a first mask 410 to form the gate lines GL, the storage common wiring 151, the first floating electrode 161, the second floating electrode 171, and the gate electrode 111.

Referring to FIG. 4, the storage common wiring 151 is formed, substantially in parallel, between two gate lines GLn-1 and GLn adjacent to each other. The storage common wiring 151 divides a pixel portion defined by the two gate lines GLn-1 and GLn adjacent to each other into the first region P1 and the second region P2.

The first and second floating electrodes 161 and 171 are formed in the first and second regions P1 and P2, respectively. The first and second floating electrodes 161 and 171 have an island shape. The first and second floating electrodes 161 and 171 are disposed symmetrically with each other with respect to the storage common wiring 151.

Because the first and second floating electrodes 161 and 171 have island shapes, an overlapping region that is to be formed between the first and second floating electrodes 161 and 171 and the data lines DL is reduced.

Therefore, an aperture ratio of the pixel portion is enhanced. That is, a ratio of the area of a sub pixel to its total screen area is increased, and thus the larger aperture ratio allows more light to pass through the LCD making the LCD appear brighter. Also, an RC delay of the data lines DL is reduced. Furthermore, a possibility of an electrical short between the storage common wiring 151 (or gate lines GL) and the data lines DL is reduced.

Referring to FIGS. 5 through 8, a gate insulation layer 102 is formed on the first transparent substrate 101 having the gate metal layer which has been patterned to form the gate lines GL, the storage common wiring 151, the first floating electrode 161, the second floating electrode 171, and the gate electrode 111. The gate insulation layer 102 includes silicon nitride (SiNx), silicon oxide (SiOx), etc. The gate insulation layer 102 is formed to have a thickness of about 4500 angstroms.

The semiconductor layer 112 is formed on the gate insulation layer 102. In particular, an amorphous silicon ("a-Si") layer and n+ doped a-Si layer are formed in sequence, for example by chemical vapor deposition ("CVD") method. The a-Si layer and n+ doped a-Si layer are patterned to form the semiconductor layer 112 having the activation layer 112a and the ohmic contact layer 112b.

A data metal layer is formed over the first transparent substrate 101 having the gate insulation layer 102 and the semiconductor layer 112 formed thereon. The data metal layer is patterned using a second mask 420 to form the data lines DL, the storage electrode 152, the first voltage-dividing capacitor electrode 162, the second voltage-dividing capacitor electrode 172, the source electrode 113, and the drain electrode 114. Thus, the switching device 110 is formed. The first and second voltage-dividing capacitor electrodes 162 and 172 include the second and third contact holes 163 and 173, respectively, formed by using the second mask 420.

Figure 8:
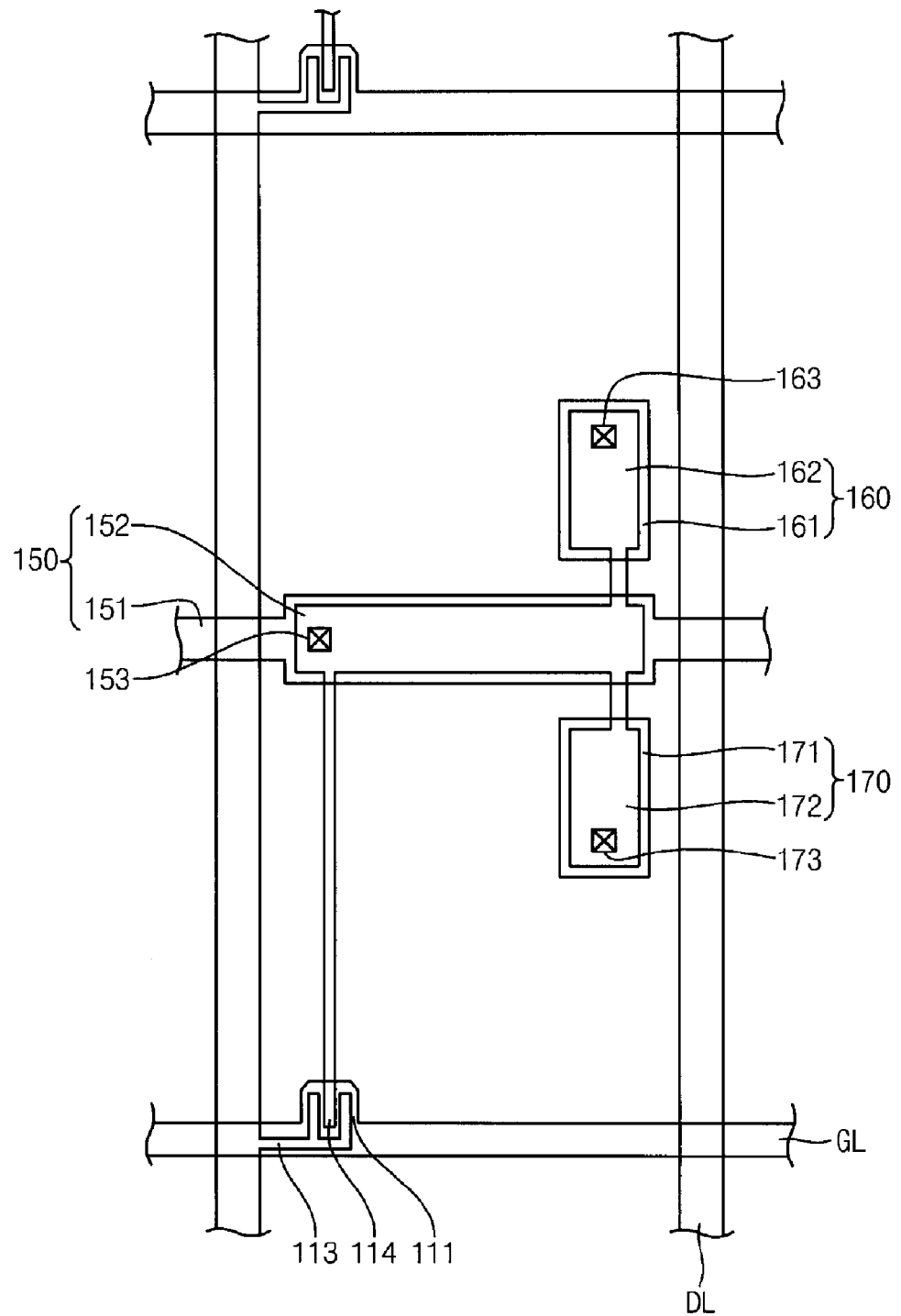

As shown in FIG. 8, the data lines DL are extended along the second direction that is substantially perpendicular to the first direction that is substantially parallel with the gate lines GL. In other words, the data lines DL and the gate lines GL are substantially perpendicular to each other. The storage electrode 152, a first metal pattern, is disposed over the storage common wiring 151, and the first and second voltage-dividing capacitor electrodes 162 and 172 are disposed over the first and second floating electrodes 161 and 171, respectively.

The first voltage-dividing capacitor electrode 162 is extended from the storage electrode 152 to be disposed over the first floating electrode 161. The second voltage-dividing capacitor electrode 172 is extended from the storage electrode 152 to be disposed over the second floating electrode 171. The second and the third contact holes 163 and 173 are formed at the first and second voltage-dividing capacitor electrodes 162 and 172, respectively.

The source and drain electrodes 113 and 114 are disposed on the semiconductor layer 112, and a portion of the ohmic contact layer 112b disposed between the source and drain electrodes 113 and 114 is removed by using the source and drain electrodes 113 and 114 as a mask, so that a channel layer of the switching device 110 is completed.

Figure 6:
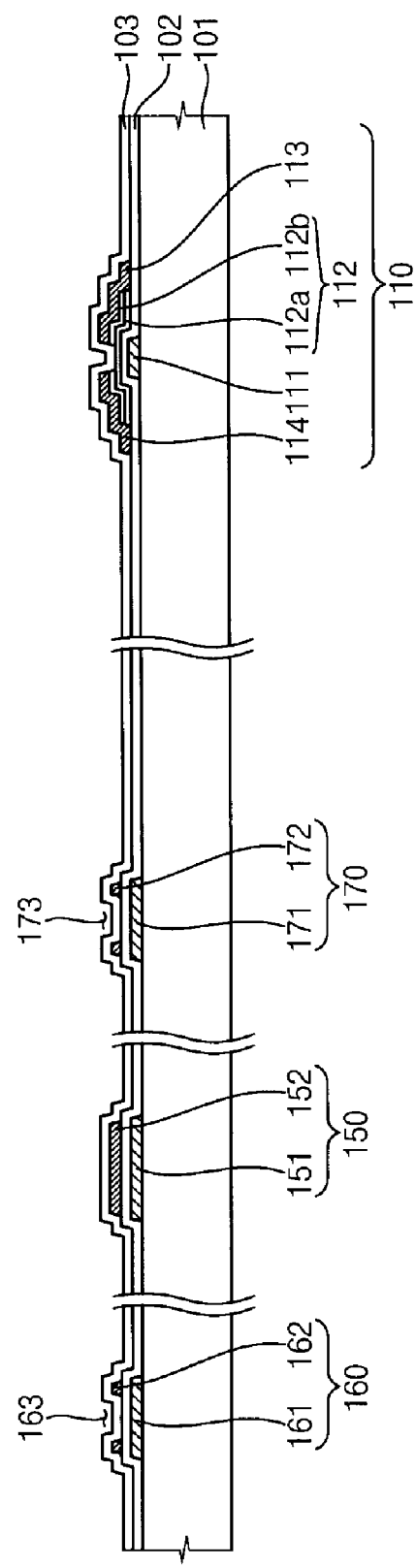
Figure 7:
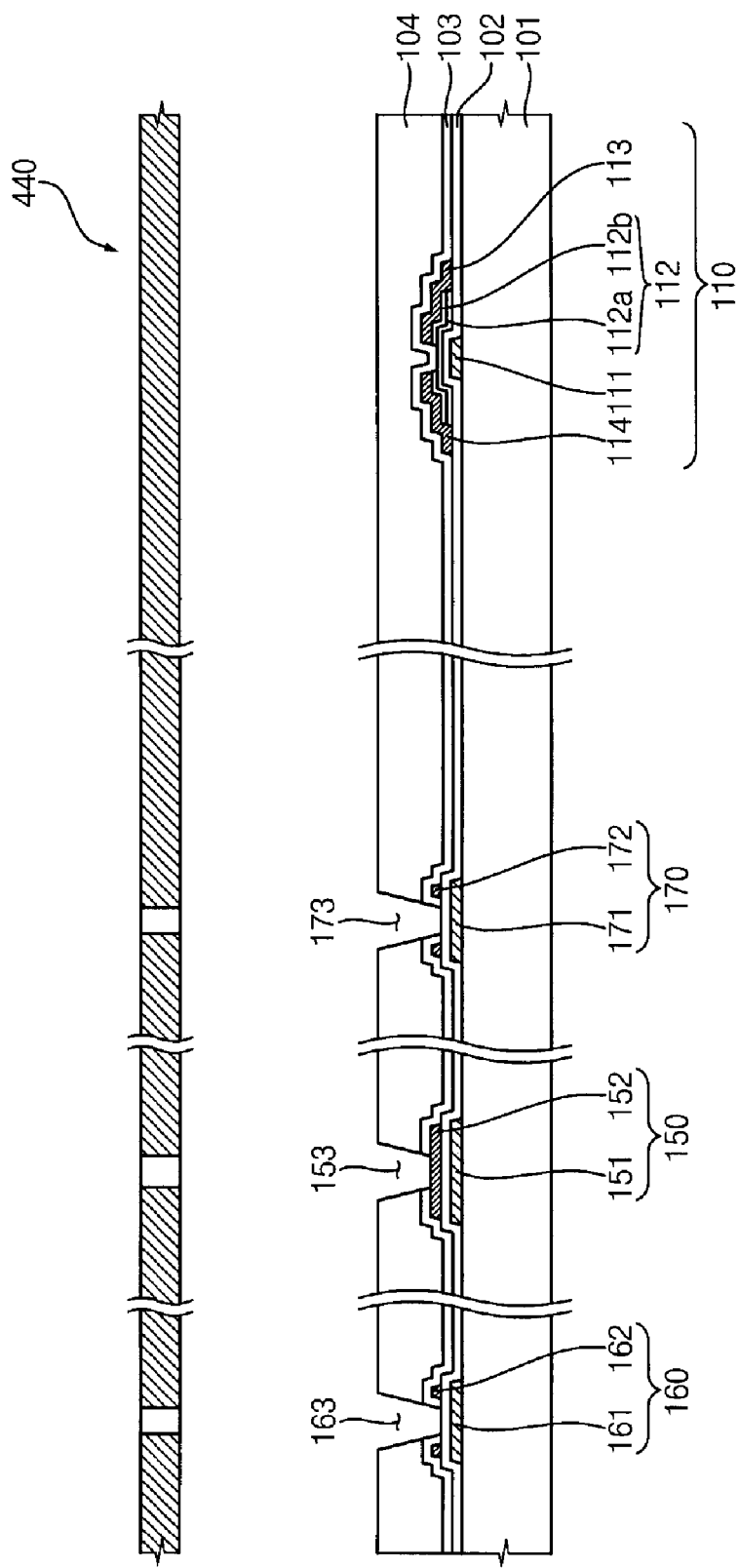

Referring to FIGS. 6 and 7, a passivation layer 103 is formed on the patterned data metal layer, such that the passivation layer 103 has a thickness of no more than about 4000 angstroms.

A photoresist is coated on the passivation layer 103 to have a thickness of about 2 μm to about 4 μm, so that the insulation layer 104 is formed. The photoresist may be coated, for example by a spin coating method. The insulation layer 104 is optically formed.

Portions of the insulation layer 104 are removed through a photolithography process using a third mask 430 to form the first, second, and third contact holes 153, 163, and 173. In particular, the first contact hole 153 is formed such that a portion of the storage electrode 152 extended from the drain electrode 114 is exposed through the first contact hole 153, and portions of the insulation layer 104, the passivation layer 103, and the gate insulation layer 102 disposed at the second and third contact holes 163 and 173 are also removed. Alternatively, portions of the insulation layer 104, which corresponds to the first, second, and third contact holes 153, 163, and 173, may be removed first and then the passivation layer 103 may be etched.

Referring to FIG. 8, other than at the gate lines GL, the data lines DL overlap with the gate metal layer only at a region where the storage common electrode wiring 151 and the data lines DL are intersected with each other. The first and second floating electrodes 161 and 171 have an island shape, so that the first and second floating electrodes 161 and 171 do not overlap with the data lines DL.

As a result, an overlapping region between the gate lines GL or the storage common wiring 151 and the data lines DL is reduced to enhance the aperture ratio. Furthermore, the RC delay of the data lines DL is reduced.

Figure 9:
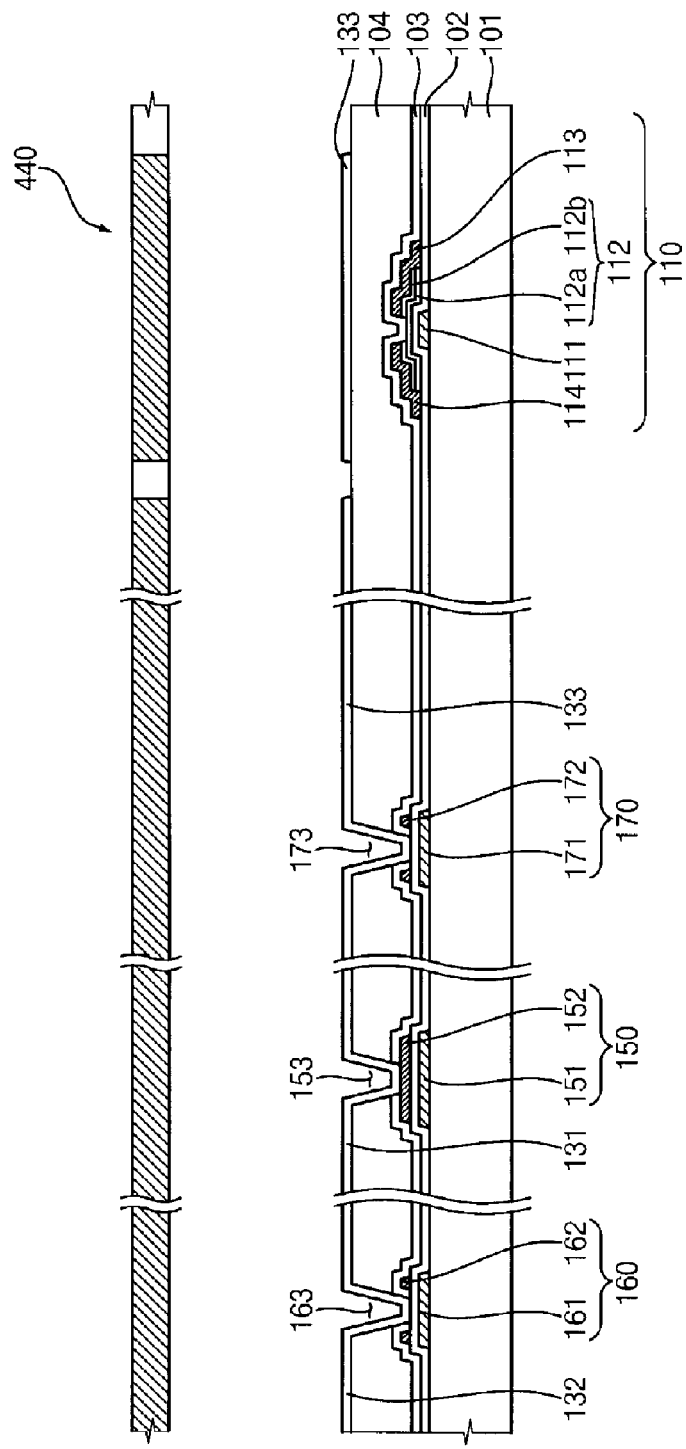
Figure 10:
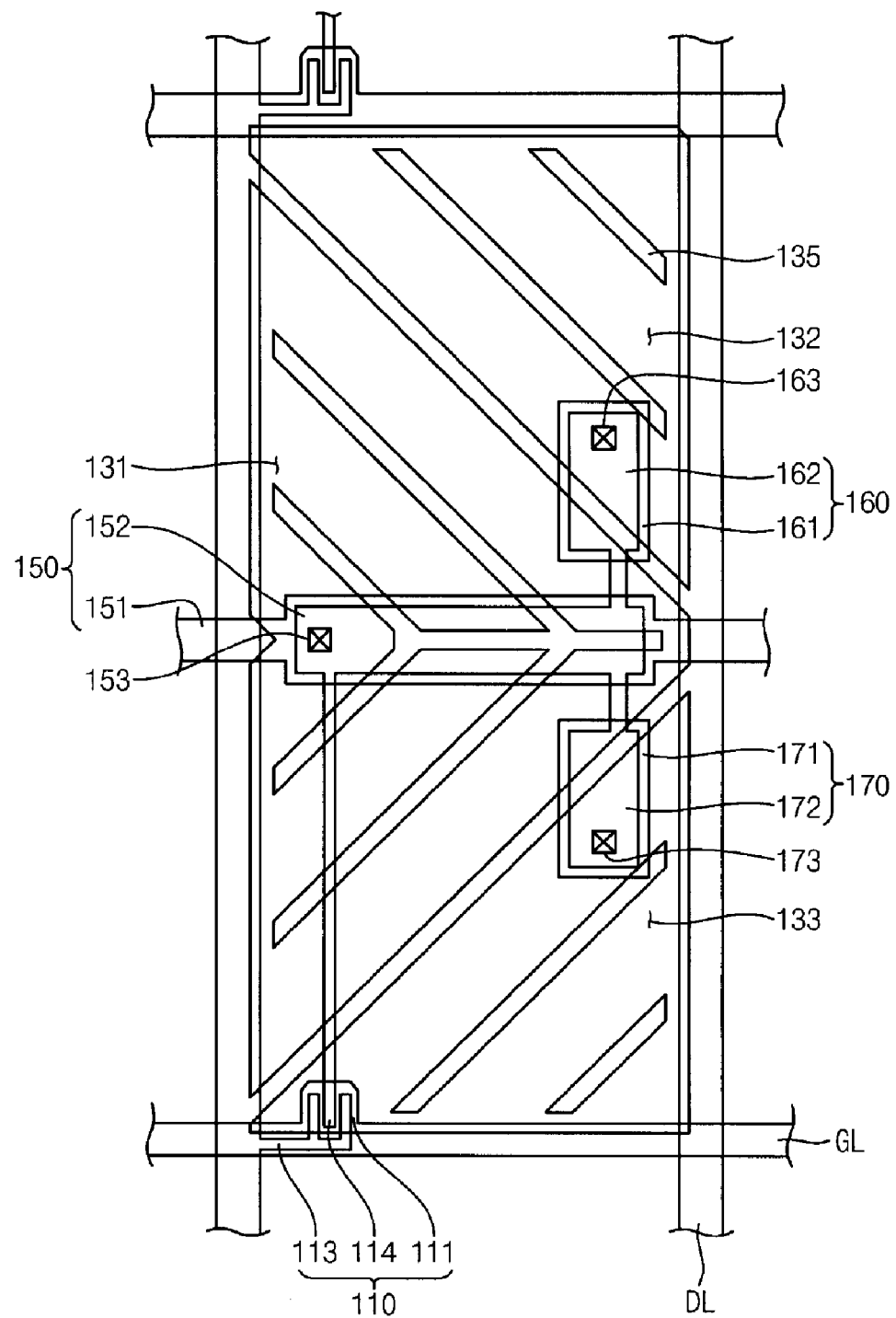

Referring to FIGS. 9 and 10, a pixel electrode layer is formed over the first transparent substrate 101 having the insulation layer 104 formed thereon. The pixel electrode layer includes an optically transparent and electrically conductive material such as indium tin oxide ("ITO"), indium zinc oxide ("IZO"), etc.

The pixel electrode layer is patterned through a photolithography process by using a fourth mask 440 to form the first sub pixel electrode 131, the second sub pixel electrode 132, and the third sub pixel electrode 133. Additionally, the first opening patterns 135 of the first sub pixel electrode 131, the second sub pixel electrode 132, and the third sub pixel electrode 133 are formed.

Referring to FIG. 10, the first sub pixel electrode 131, the second sub pixel electrode 132, and the third sub pixel electrode 133 are formed at the pixel portion. The first sub pixel electrode 131 corresponds to the storage capacitor 150, the second sub pixel electrode 132 corresponds to the first voltage-dividing capacitor 160, and the third sub pixel electrode 133 corresponds to the second voltage-dividing capacitor 170.

A first voltage V1 stored by the storage capacitor 150 is applied to the first sub pixel electrode 131, a second voltage V2 stored by the first voltage-dividing capacitor 160 is applied to the second sub pixel electrode 132, and a third voltage V3 stored by the second voltage-dividing capacitor 170 is applied to the third sub pixel electrode 133.

The first and second voltage-dividing capacitors 160, 170 are electrically charged by a same voltage so that the second and third voltages V2 and V3 are substantially equal to each other. In other words, the same voltages are applied to the second and third sub pixel electrodes 132, 133.

Figure 11:
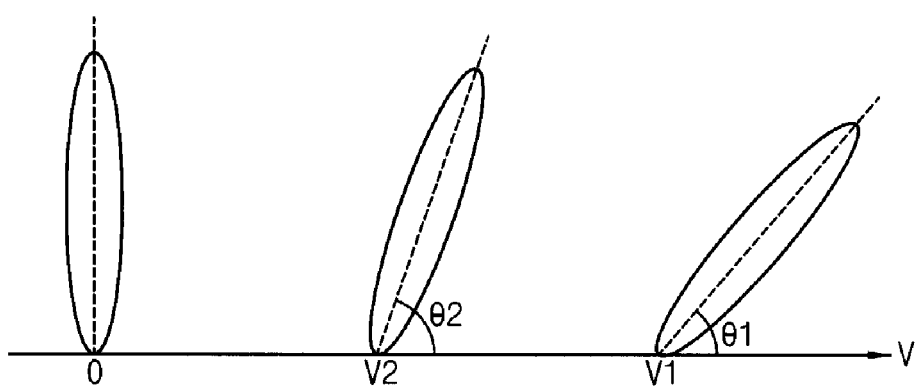
FIG. 11 is a schematic view illustrating an inclination angle of an exemplary liquid crystal molecule of the display panel in FIG. 1.

FIG. 11 is a schematic view illustrating an inclination angle of an exemplary liquid crystal molecule of the display panel in FIG. 1. The inclination angle corresponds to an angle of director of the liquid crystal molecule within the liquid crystal layer 300 with respect to a virtual plane that is substantially perpendicular to the array substrate 100.

Referring to FIGS. 1 and 11, liquid crystal molecules are vertically arranged when no electric field is applied thereto. In other words, the inclination angle is about 90 degrees.

When electric fields are applied to the liquid crystal in order to display an image, the first voltage V1 is applied to the storage capacitor 150, and second and third voltages V2 and V3 that are substantially the same are applied to the first and second voltage-dividing capacitors 160 and 170, respectively, so that the liquid crystal molecules are arranged such the liquid crystal molecules corresponding to the storage capacitor 150 are arranged to form a first inclination angle $\theta_1$ and the liquid crystal molecules corresponding to the first and third sub capacitors 160 and 170 are arranged to form a second inclination angle $\theta_2$.

In particular, when the first voltage V1 is applied to the storage capacitor 150, the liquid crystal molecules corresponding to the storage capacitor 150 are arranged to form the first inclination angle $\theta_1$, and when the second voltage V2 that is lower than the first voltage V1 is applied to the first and second voltage-dividing capacitors 160 and 170, the liquid crystal molecules corresponding to the first and second voltage-dividing capacitors 160 and 170 are arranged to form the second inclination angle $\theta_2$ that is greater than the first inclination angle $\theta_1$ ($0<\theta_1$, $\theta_2<90°$, $\theta_1<\theta_2$).

As described above, one pixel portion is driven by differing storage capacitors to form two different inclination angles, so that viewing angle of the LCD is widened.

Figure 12:
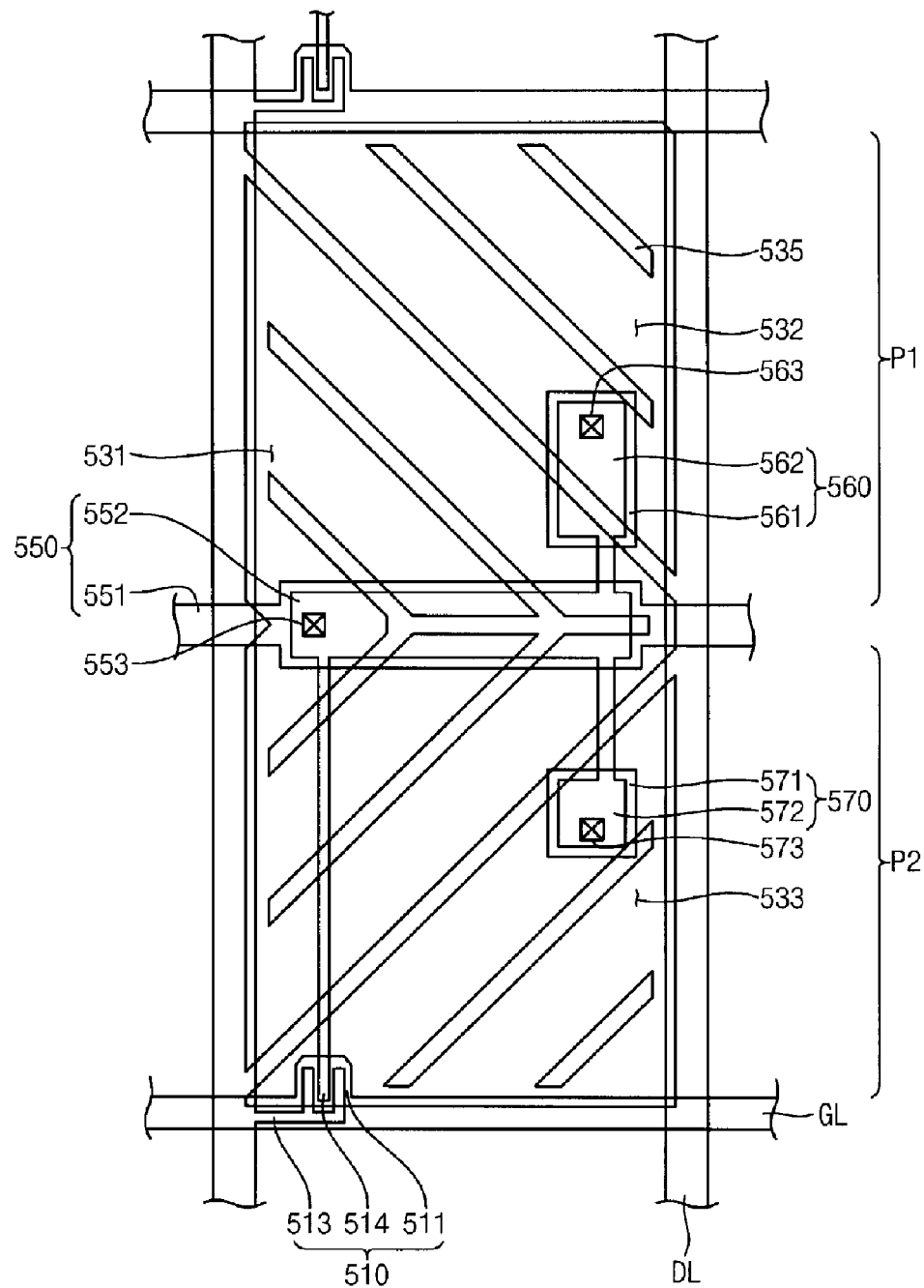
FIG. 12 is a layout illustrating another exemplary embodiment of a pixel portion of a display panel according to the present invention.

FIG. 12 is a layout illustrating another exemplary embodiment of a pixel portion of a display panel according to the present invention.

Referring to FIG. 12, an array substrate includes a plurality of gate lines GL, a plurality of data lines (or source lines) DL, and a plurality of pixel portions. The gate lines GL are extended along a first direction, and the data lines DL are extended along a second direction that is substantially perpendicular to the first direction. Each of the pixel portions is defined by one of the gate lines GL and one of the data lines DL, as previously described with respect to FIGS. 1 and 2.

Each of the pixel portions includes a switching device 510, a first sub pixel electrode 531, a second sub pixel electrode 532, a third sub pixel electrode 533, a storage capacitor 550, a first voltage-dividing capacitor 560, and a second voltage-dividing capacitor 570.

The switching device 510 includes a gate electrode 511 electrically connected to one of the gate lines GL, a source electrode 513 electrically connected to one of the data lines DL, and a drain electrode 514 electrically connected to the first sub pixel electrode 531. A semiconductor layer is disposed between the gate electrode 511, and the source and drain electrodes 513 and 514. The first sub pixel electrode 531 is electrically connected to the drain electrode 514 through a first contact hole 553. The second sub pixel electrode 532 and the third sub pixel electrode 533 are symmetrical with respect to the first sub pixel electrode 531. As illustrated, the first, second, and third sub pixel electrodes 531, 532, and 533 may have substantially the same arrangement as the first, second, and third sub pixel electrodes 131, 132, and 133 as previously described with respect to FIGS. 1 and 2, or they may have varying shapes.

The first sub pixel electrode 531, and the second and third sub pixel electrodes 532 and 533 include first opening patterns 535, which may be similar to the first opening patterns 135 of FIG. 1. The first and third sub pixel electrodes 532 and 533 are separated from each other. Alternatively, the first and third sub pixel electrodes 532 and 533 may be integrally formed with each other.

The first sub capacitor 550, which is a storage capacitor, includes a storage common wiring 551 and the first metal pattern 552, which is a storage electrode. The storage common wiring 551 is substantially in parallel with the gate lines GL, and divides the pixel portion into a first region P1 and a second region P2.

The storage common wiring 551 having a first size corresponds to a first electrode of the first sub capacitor 550. The first metal pattern 552 extended from the drain electrode 514 corresponds to a second electrode of the first sub capacitor 550. The first contact hole 553 is disposed at the first metal pattern 552, so that the drain electrode 514 and the first sub pixel electrode 531 are electrically connected to each other through the first contact hole 553.

The second sub capacitor 560, which is a first voltage-dividing capacitor, includes a first floating electrode 561, a second metal pattern 562, a second contact hole 563, a second sub pixel electrode 532, and a common electrode formed at the color filter substrate, similar to color filter substrate 200 of FIG. 2, that corresponds to a counter substrate of the array substrate.

The first floating electrode 561 has a second size that is smaller than the first size of the storage common wiring 551. A second metal pattern 562, which is a first voltage dividing capacitor electrode, is extended from the first metal pattern 552 and disposed over the first floating electrode 561. The first floating electrode 561 is electrically connected to the second sub pixel electrode 532 through the second contact hole 563. The first floating electrode 561 corresponds to a first electrode of the second sub capacitor 560. The common electrode, formed at the color filter substrate, corresponds to a second electrode of the second sub capacitor 560.

The third sub capacitor 570, which is a second voltage-dividing capacitor, includes a second floating electrode 571, a third metal pattern 572, which is a voltage-dividing capacitor electrode, a third contact hole 573, a third sub pixel electrode 533, and the common electrode.

The second floating electrode 571 has the third size that is smaller than the second size of the first floating electrode 561. In other words, the first and second floating electrodes 561 and 571 are disposed at symmetrical positions with each other with respect to the storage common wiring 151 but have different sizes.

The third metal pattern 572 is extended from the first metal pattern 552, and disposed over the second floating electrode 571. The second floating electrode 571 is electrically connected to the third sub pixel electrode 533 through the third contact hole 573. The second floating electrode 571 corresponds to a first electrode of the third sub capacitor 570. The common electrode, formed at the color filter substrate, corresponds to a second electrode of the third sub capacitor 570.

A display panel including the array substrate in FIG. 12 includes the color filter panel having second opening patterns as shown in FIGS. 1 and 2.

Figure 13:
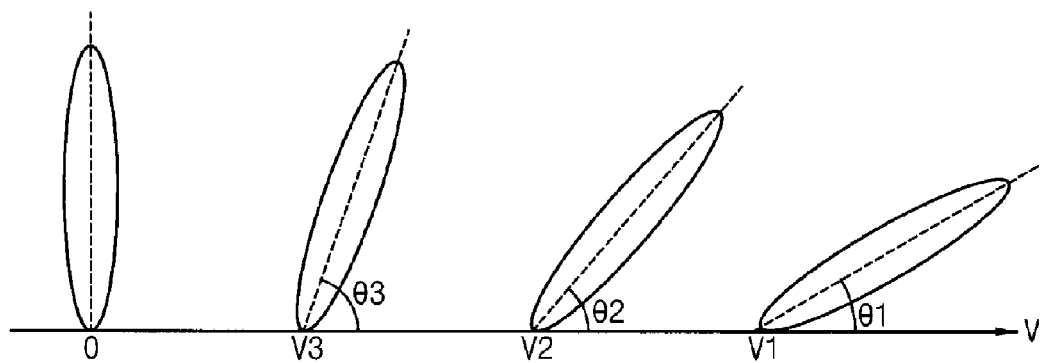
FIG. 13 is a schematic view illustrating an inclination angle of an exemplary liquid crystal molecule of the display panel in FIG. 12.

FIG. 13 is a schematic view illustrating an inclination angle of an exemplary liquid crystal molecule of the display panel in FIG. 12.

Referring to FIGS. 1 and 13, liquid crystal molecules are vertically arranged within the liquid crystal layer when no electric field is applied thereto. In other words, the inclination angle is about 90 degrees.

When electric fields are applied to the liquid crystal in order to display an image, the first voltage V1 is applied to the first sub capacitor 150, and the second voltage V2 and the third voltage V3 are applied to the second and third sub capacitors 560 and 570, respectively, so that the liquid crystal molecules are arranged such the liquid crystal molecules corresponding to the first sub capacitor 550 are arranged to form a first inclination angle $\theta_1$ and the liquid crystal molecules corresponding to the second and third sub capacitors 560 and 570 are arranged to form a second inclination angle $\theta_2$ and a third inclination angle $\theta_3$, respectively.

In particular, when the first voltage V1 is applied to the first sub capacitor 550, the liquid crystal molecules corresponding to the first sub capacitor 550 are arranged to form the first inclination angle $\theta_1$, when the second voltage V2 that is lower than the first voltage V1 is applied to the second sub capacitor 560, the liquid crystal molecules corresponding to the second sub capacitor 560 are arranged to form the second inclination angle $\theta_2$ that is greater than the first inclination angle $\theta_1$, and when the third voltage V3 that is lower than the second voltage V2 is applied to the third sub capacitor 570, the liquid crystal molecules corresponding to the third sub capacitor 570 are arranged to form the third inclination angle $\theta_3$ that is greater than the second inclination angle $\theta_2$ ($0<\theta_1<\theta_2<\theta_3<90°$, when V1>V2>V3).

As described above, one pixel portion is driven by three different storage capacitors to form three different inclination angles, so that viewing angle is more widened.

As described above, according to the present invention, the common electrodes of the voltage-dividing capacitors have an island shape, so that an overlapping area with the data lines is reduced to reduce the RC delay and enhance aperture ratio. Furthermore, a probability of occurrence of an electrical short is reduced.

Additionally, when the storage capacitors have different sizes, a viewing angle may be widened even more.

Having described the exemplary embodiments of the present invention and its advantages, it is noted that various changes, substitutions and alterations can be made herein without departing from the spirit and scope of the invention as defined by appended claims.

What is claimed is:

1. A display panel comprising:
a first substrate including a common electrode;
a second substrate facing the first substrate, the second substrate comprising:
   a switching device formed in a pixel region;
   a first sub pixel electrode connected to a drain electrode of the switching device and receiving a first voltage;
   a second sub pixel electrode receiving a second voltage, the second voltage is different from the first voltage; and
   a third sub pixel electrode receiving a third voltage, the third voltage is different from the first voltage; and
a liquid crystal layer disposed between the first and second substrates,
wherein the first sub pixel electrode receives the first voltage from a storage capacitor,
the second sub pixel electrode receives the second voltage from a first voltage-dividing capacitor, the first voltage-dividing capacitor comprises a first floating electrode electrically connected to the second sub pixel electrode and a first voltage-dividing capacitor electrode, and
the third sub pixel electrode receives the third voltage from a second voltage dividing capacitor, the second voltage-dividing capacitor comprises a second floating electrode electrically connected to the third sub pixel electrode and a second voltage-dividing capacitor electrode,
wherein the second and third sub pixel electrodes are separate and distinct from that of the first and second floating electrodes.

2. The display panel of claim 1, wherein the storage capacitor includes a storage common wiring dividing the pixel region into a first region and a second region, and a storage electrode extended from the drain electrode of the switching device, the storage electrode disposed over the storage common wiring,
the first floating electrode is disposed in the first region, the first voltage-dividing capacitor electrode extended from the storage electrode, the first voltage-dividing capacitor electrode disposed over the first floating electrode, and
the second floating electrode is disposed in the second region, the second voltage-dividing capacitor electrode extended from the storage electrode, the second voltage-dividing capacitor electrode disposed over the second floating electrode.

3. The display panel of claim 2, wherein the first and second floating electrodes and a plurality of gate lines are formed from the same metal layer.

4. The display of claim 2, wherein the first and second voltage-dividing capacitor electrodes and a plurality of data lines are formed from the same metal layer.

5. The display panel of claim 2, wherein the first sub pixel electrode is disposed in both the first region and the second region and occupies a greater area of the pixel region than the second and third sub pixel electrodes.

6. The display panel of claim 2, wherein the first sub pixel electrode is electrically connected to the storage electrode of the storage capacitor,
the second sub pixel electrode is electrically connected to the first floating electrode of the first voltage-dividing capacitor and disposed in the first region, and
the third sub pixel electrode is electrically connected to the second floating electrode of the second voltage-dividing capacitor and disposed in the second region.

7. The display panel of claim 2, wherein the first floating electrode is larger than the second floating electrode.

8. The display panel of claim 1, wherein the first voltage is larger than the second voltage, and
the second voltage is larger than the third voltage.

9. The display panel of claim 8, wherein a capacitance of the storage capacitor is larger than a capacitance of the first voltage-dividing capacitor, and
the capacitance of the first voltage-dividing capacitor is larger than a capacitance of the second voltage-dividing capacitor.

10. The display panel of claim 1, wherein the first, second, and third sub pixel electrodes comprise opening patterns.

* * * * *